Figure 1:
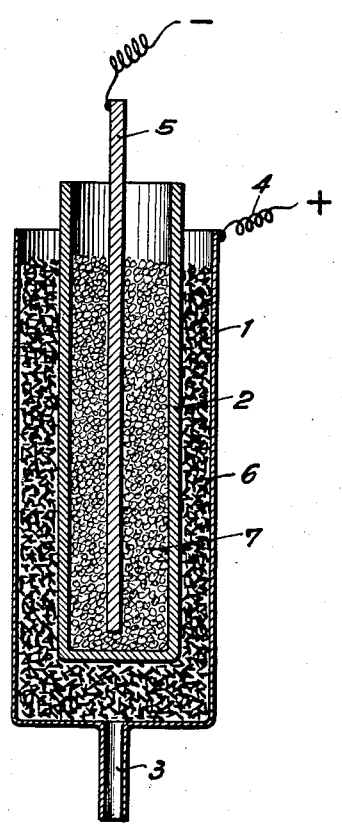

April 8, 1958

E. JUSTI ET AL 2,830,109

FUEL CELL

Filed May 29, 1952

2 Sheets-Sheet 1

INVENTOR
Friedrich Eduard Justi,
Herbert Spengler
BY: Burgess & Dinklage
ATTORNEY April 8, 1958     E. JUSTI ET AL     2,830,109
FUEL CELL Filed May 29, 1952     2 Sheets-Sheet 2

2,830,109

FUEL CELL

Eduard Justi, Braunschweig, and Friedrich Herbert Spengler, Oberhausen-Sterkrade, Germany, assignors, by direct and mesne assignments, of one-half to Ruhrchemie Aktiengesellschaft, Oberhausen-Holten, and one-half to Steinkohlen - Elektrizitaets - Aktiengesellschaft, Essen, Germany, a corporation of Germany Application May 29, 1952, Serial No. 290,722

Claims priority, application Germany June 4, 1951

16 Claims. (Cl. 136—84)

This invention relates to the direct electrochemical conversion of the chemical energy of carbon or of combustible gases into electrical energy.

The theoretical possibility of the conversion of the chemical energy of carbon, such as coal, or of combustible gases directly into electrical energy electrochemically, is known. The fundamental advantage of such an electrochemical working method as contrasted to the conventionally used thermodynamic conversion is reflected in the relative efficiencies of the two methods. The efficiency of the electrochemical conversion, with reversible conduction of the process, may be brought as close as desired to unity. (As to "reversible conduction of the process," see A. Eucken, "Grundriss der physikalischen Chemie," pages 276 et seq. and 323 et seq., Leipsig, 1944.) A comparable efficiency by thermodynamic conversion using a heat engine, may only be effected with the use of very great temperature differences which may not be practically obtained. For this reason, the efficiency of the best modern power stations using heat engines is only approximately 30%.

In the practical realization of the electrochemical conversion, however, considerable difficulties are encountered. The carbon is extremely slow to react at normal temperatures in a "fuel cell" used for this purpose. In order to avoid a polarization in such a cell, it is necessary to work at considerably increased temperatures of approximately 600° C. and higher.

A great number of attempts and proposals has been made to produce such a fuel cell, which is practically operable. None of these attempts, however, have proven successful in practical operation. (See, for example, the summarizing review by Justi, "Leitfaehigkeit und Leitfaehigkeitsmechanismus fester Stoffe," Goettingen, 1948.) According to the experience thus far gained, however, it appears most favorable to use solid conductors for the electrolyte of the fuel cell, since the use of liquid electrolytes causes unsurmountable difficulties with respect to the material and with respect to the fact that the oxygen electrode must not be moistened by the liquid electrolyte. (See the summarizing review by Baur and Preis, "Zeitschrift fuer Elektrochemie," vol. 43, page 727 (1937).)

As such a solid conductor, a mixture of clay, cerium dioxide in the form of residues from the ignition of monazite, and tungsten trioxide has been suggested by Baur and Preis (Zeitschrift fuer Elektrochemie, vol 43, p. 727, 1937). With the use of this electrolyte, an electromotive force of approximately 0.7 volt may be reached by the cell, this cell being hereinafter referred to as the "Baur cell." This is approximately 70% of the theoretical attainable electromotive force of 1.02 volts. This solid conductor, however, is not satisfactory for practical purposes, since in continuous operation the material undergoes irreversible changes rather rapidly.

Another disadvantage of Baur's cell lies in the fact that a sufficiently low internal resistance is not reached except at very high temperatures of approximately 1100° C. Such high temperatures are extremely disadvantageous in practical operation, since they require a great expenditure for heat insulation in order to keep the heat losses within reasonable limits. In addition, great difficulties are encountered with respect to the material in building up larger elements, and, finally, when operating the cell with gases, the efficiency is affected by a dissociation of the carbon monoxide occurring at high temperatures as a secondary reaction according to the equation:

$$2CO_2 = 2CO + O_2$$

One object of this invention is the direct electrochemical conversion of the chemical energy of carbon or of combustible gases into electrical energy without the above-mentioned disadvantages.

A further object of this invention is a fuel cell for this electrochemical conversion.

Figure 3:
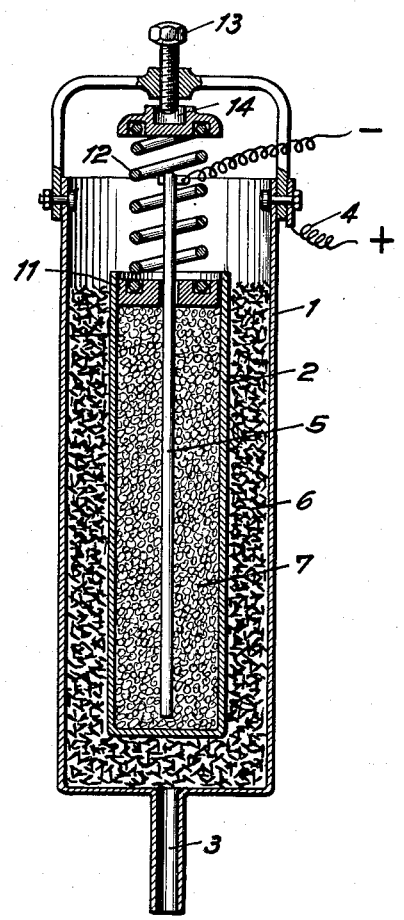
Figure 2:
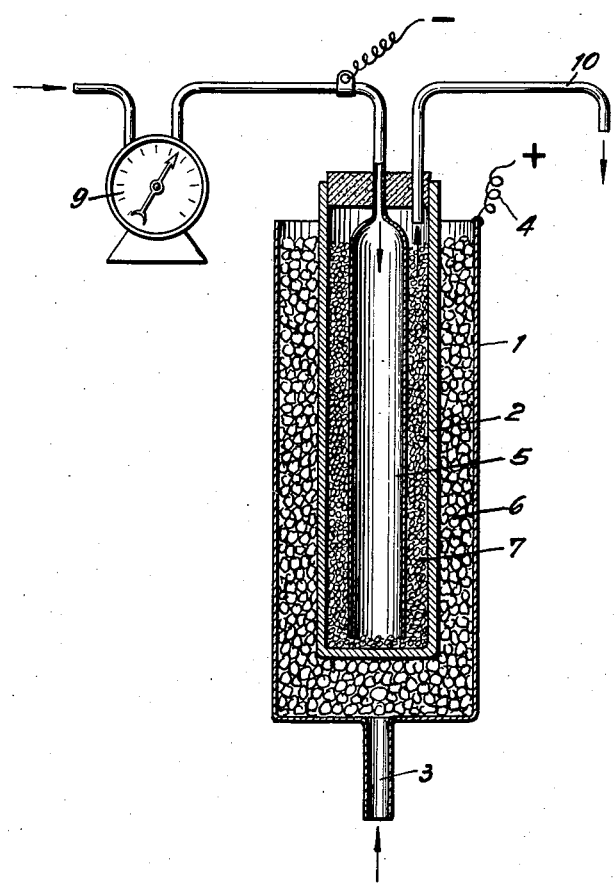

A still further object of this invention is a method for the production of a carrierless solid conductor for the electrolyte of such a fuel cell. These, and still further objects will become apparent from the following description read in conjunction with the drawing, in which:

Fig. 1 diagrammatically shows a vertical section of a fuel cell for the direct conversion of the chemical energy of solid fuels into electrical energy in accordance with the invention, Fig. 2 diagrammatically shows the corresponding arrangement for the conversion of the chemical energy of combustible gases into electrical energy, and Fig. 3 diagrammatically shows a vertical section of a fuel cell in accordance with the invention, having means for exerting a mechanical load on the coal or oxide granules to increase the current yield.

It has been found that the chemical energy of carbon or of combustible gases, such as hydrogen, methane and other hydrocarbons and carbon monoxide and mixtures thereof may be directly electrochemically converted into electrical energy by the reaction of the coal or of the gases in a fuel cell which, as contrasted to the known working method with liquid electrolytes, has a solid conductor composed of a carrierless body of alkali carbonate or alkaline earth carbonate prepared by fusing or sintering or a solid conductor composed of a porous ceramic body soaked with an electrolyte, preferably with a salt of the alkali group or alkaline earth group. Particularly well suited are the salts of the alkali groups, chiefly sodium carbonate. Regarding the fact that a rapid diffusion of the atoms or atom groups of the electrolyte is of importance in the electrochemical process in the electrolyte, it is of advantage, as is known from the theory of ionic conduction, to build in foreign atoms into the structure. This may be accomplished, for example, by mixing with other alkalis. However, also carbonates of heavy metals may be used in small quantities. A general prescription for this admixture cannot be given. However, the admixture must always amount to only low percentages of 0.1% to a maximum of 10% in order to prevent substantial depressions of the melting point. These considerations apply in general, whether it be a soaked cell or a carrierless cell. Particularly well suited from the alkaline earth group is the calcium carbonate which decomposes most difficultly. With calcium carbonate, however, the temperature of the element must not exceed approximately 650° C.

The electrochemical conversion with this fuel cell should be effected at temperatures which are lower than the melting point of the solid conductor.

The mechanism of reaction in such a cell would be as follows:

Soda, given as an example of an alkali carbonate, consists of $Na^+$ and $CO_3^{--}$ ions. At higher temperatures, the Na⁺ ions travel to the cathode and react there with the oxygen according to the equation:

$$4Na^+ + O_2 + 4e^- = 2Na_2O$$

Thereby, 4 electrons are taken away from the cathode which accordingly charges positively. The corresponding process in the anode may be described by the equation:

$$C + 2CO_3^{--} = 3CO_2 + 4e^-$$

Four electrons are supplied to the anode so that it charges negatively.

By these processes, an excess of $CO_3^{--}$ ions results at the cathode and of Na⁺ ions at the anode. These differences in concentration tend to balance themselves by diffusion, and in the dead state an equilibrium develops in such a manner that the forces of diffusion striving for the equilibrium of concentration and the electric forces resulting from the charge of the electrodes counterbalance themselves. The difference in potential of the electrodes required for this purpose finally represents the electromotive force of the element.

The reaction products, $Na_2O$ and $CO_2$, accumulating at the electrodes are neutral ones, i. e. they undergo no dynamic effect by the electrical field. Only the diffusion potentials caused by the difference in concentration act upon them. In the rediffusion, they react according to the equation:

$$2Na_2O + 2CO_2 = 2Na_2CO_3$$

Sodium carbonate is again formed which, for its part, dissociates again to Na⁺ and $CO_3^{--}$ ions. This back reaction is of the greatest importance for a continuous operation of the element with the discharge of current, since otherwise a deficiency of ions would occur in the electrolyte resulting in a gradual standstill of the operation.

In summary, the processes in the element may be expressed by the following scheme:

| | |
|---|---|
| Process in the anode: | $C + 2CO_3^{--} = 3CO_2 + 4e^-$ |
| Process in the cathode: | $O_2 + 4Na^+ + 4e^- = 2Na_2O$ |
| Reformation by thermal diffusion: | $2Na_2O + 2CO_2 (= 2Na_2CO_3) =$ 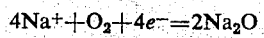 $4Na^+ + 2CO_3^{--}$ |
| Total process: | $C + O_2 = CO_2 + A$ | where A represents the work which must be spent by the transport of 4 negative elementary charges against the force of the electrical field or which is given off by the element. Quantitatively, it corresponds to approximately the thermal energy evolving in the combustion of the carbon.

In a similar way, the reaction may be expressed for the use of combustible gases, such as hydrogen. Here, the corresponding reaction scheme is as follows:

| | |
|---|---|
| Process in the anode: | $2CO_3^{--} + 2H_2 = 2H_2O + 4e^-$ |
| Process in the cathode: | $4Na^+ + O_2 + 4e^- = 2Na_2O$ |
| Reformation by thermal diffusion: | $2Na_2O + 2CO_2 (= 2Na_2CO_3) =$ 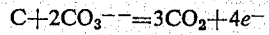 $4Na^+ + 2CO_3^{--}$ |
| Total process: | $2H_2 + O_2 = 2H_2O + A$ |

If the solid conductor used in the fuel cell in accordance with the invention consists of a porous ceramic body which is soaked with one of the salts of the alkali or alkaline earth groups, it has been found particularly advantageous if the ceramic carrier consists of a basically reacting material and preferably of magnesium oxide, which, for reasons of corrosion, must be completely free from silicates. Ceramic silicate carriers will be strongly attacked at temperatures which are lower than the melting point of the alkali carbonates.

The use of a carrierless body of alkali carbonate or alkaline earth carbonate as the solid conductor for the fuel cell, has proven particularly advantageous. No ceramic carrier is used at all, and the solid conductor is prepared by casting in a suitable nickel or coal mold, or by pressing and subsequently sintering the salt used for the electrolyte. Electrolytes for cells of this type thus consist of a carrierless, hollow cylinder prepared by casting the molten material. The life of the elements prepared from these castings is largely dependent on the structure of the material. Extensive investigations have shown that:

(1) The losses which the electrolyte suffers by evaporation or dissociation are smaller, the lower the porosity of the material is.

(2) In order to obtain a casting which is as free as possible from pores, the casting should be cooled as rapidly as possible.

(3) In order to obtain the dense structure desired, the forming crystallites should crystallize in fine grains rather than in the conventional needles.

(4) In order to obtain a uniform and rapid cooling, the cylinder should be cast in hollow form, closed at one end, rather than as a solid cylinder.

The diameter of the cylinder which may consist of the ceramic material soaked with alkali carbonate or of the electrolyte itself, is advantageously between 10 and 100 mm. The most favorable dimension has been found to be an internal diameter of approximately 30 mm. For reasons of the internal resistance, it is advantageous to select the ratio of the surface to the content of the electrolyte body as high as possible. For this reason, besides the circular cross section shape which is of course most simply producible, also other cross section shapes such as, for example, square, rectangular or star-shaped cross sections, will be chosen.

In accordance with the invention, it has been found that these hollow cylinders closed at one end and consisting of carrierless bodies of alkali and alkaline earth carbonate, may be prepared in a particularly advantageous manner by the following method which, as contrasted to many other conceivable processes, gives castings which are really free from cracks and pores: The melt is poured into a metal cylinder, the internal diameter of which corresponds to the outside diameter of the electrolyte cell, allowance being made for the shrinkage which will occur. A cylindrical, or preferably a slightly conical punger, the diameter of which corresponds to the inside diameter of the cell to be formed, is then concentrically inserted into this metal cylinder. After the insertion of the plunger, the melt solidifies superficially at the outer wall of the plunger. Immediately after this solidification, while the material is in plastic state, the plunger must be drawn out in order to prevent the solidifying melt from adhering to the plunger by the shrinking which will proceed to commence at this point. The velocity of immersion is of particular importance as the time of stay of the plunger in the melt and the velocity of withdrawing the plunger. The velocities at which the individual measures mentioned must be carried out must be determined according to the particular conditions, especially according to the dimensions of the cell and the temperature of the melt. The working, in accordance with this method, permits the reduction of the wall thickness of the cells to a degree which was heretofore obtainable only with great difficulty. Such a reduction of the wall thickness is essential for obtaining the lowest possible internal resistance of the element.

The use of a nickel mold has proven particularly advantageous in order to prevent the cast cylinder from adhering to the surface of the mold. It is also possible to use other materials for the construction of the mold and to nickel-plate the surface of these materials.

According to another embodiment for the preparation of the solid conductor in accordance with the invention, the surface of the mold is nickel or nickel-plated, and the plunger is prepared of a material to which the melt will adhere, such as, for example, pure iron. In accordance with this embodiment, the time of stay of the plunger in the melt is chosen so that a thin layer of the melt adheres to it, which layer is drawn out with the plunger.

While the layer adhering to the plunger will crack on cooling, a cylinder remains in the nickel-plated mold, the wall thickness of which may be reduced to approximately 1 mm. without formation of pores or cracks.

In order to increase the rate of crystallization of the melt, it is frequently advantageous to add crystal nuclei to the melt in a conventional manner. The addition of 0.1–10% and preferably 1% of aluminium oxide has proven particularly useful for this purpose.

With reference to the drawings, which show a fuel cell for the conversion of the chemical energy of coal into electrical energy in accordance with the invention, 1 is the outer shell of the cell. This outer container serves, on the one hand, as a structural element for building up the fuel cell and, at the same time, as the positive discharging electrode against the copper oxide. It must be prepared of a material which, even for longer periods, will not be attacked by the oxygen. Alloys of so-called nonscaling steel have proven particularly good. Of course, it is also possible to prepare the container of any ceramic material which is provided with a nonscaling conductive electrode. In Fig. 1, a positive electric current lead 4 is connected to this outer shell. A solid conductor 2 is concentrically positioned in the outer shell 1. This solid conductor is in the form of a cylinder closed at the bottom and may, in accordance with the invention, be constructed of ceramic carrier material soaked with alkali carbonate or be the carrierless cast or sintered cell mentioned above. According to the mechanism of reaction described above, the oxygen electrode 6 must consist of a polyvalent metal oxide, i. e. the metal must have several oxidation stages. Accordingly, ferro-ferri-oxide ($Fe_3O_4$) has generally been used thus far as the oxide electrode. The use of this $Fe_3O_4$ has been found, however, to exhibit considerable disadvantages, since it will form chemical compounds such as sodium ferrites with the alkali or alkaline earth of the electrolyte. The formation of such compounds will lead to the gradual destruction of the solid electrolyte. In addition, uncontrollable counter-voltages are caused by electrochemical conditions which arise from the mixture of FeO and $Fe_2O_3$ in the $Fe_3O_4$. For this reason, a great number of other metal oxides has been investigated by the inventors. Amongst these oxides, copper oxide has proven particularly good. This oxygen electrode should advantageously consist of copper oxide of the composition $Cu_xO$ in which $x$ is greater than 1 and smaller than 2.

As investigations of J. A. Hedvall and co-workers (Zeitschrift fuer anorganische and allgemeine Chemie, vol. 119 (1921)) have shown, copper oxides do not enter chemical compounds with alkali or alkaline earth carbonates. In addition, it is known that stoichiometrically composed copper oxide (CuO) or cuprous oxide ($Cu_2O$) present an insulator, whereas a copper oxide of the composition in accordance with the invention exhibits excellent semi-conducting properties at the temperature used in the fuel element. (E. Justi, "Leitfaehigkeit und Leitungsmechanismus fester Stoffe," 1948, p. 171, Table 15.)

When using copper oxide as the oxygen electrode, the method for the production thereof exerts a substantial influence on the later properties. This is of substantial importance, and thus copper oxide electrodes have been found to have particularly favorable properties when prepared by oxidizing very pure copper granules or short pieces of copper wire in an oxidizing atmosphere. The production of this copper oxide by treating solid copper with a welding torch, for example, has not proven favorable.

In order to keep the internal resistance of the element as low as possible, it is expedient to keep the copper oxide layer as thin as is possible. On the other hand, the individual copper oxide particles must not be too small in order to have not a too high resistance to the reoxidizing oxygen or air stream. It is of advantage to select a thickness of the copper oxide particles of between 0.5 and 3 mm. while the thickness of the oxide layer is favorably between 2 and 8 mm.

When using the oxygen electrode prepared in accordance with the invention, the resistances of transition which are of particular importance for the internal resistance of the element, are kept low. A further advantage resides in the fact that the oxide particles frit superficially together with the solid electrolyte, thus greatly reducing the internal resistance of the element. Finally, it is of practical advantage to effect the oxidation of the copper fully or partially within the element itself, since in this way the fritting together between the copper oxide and the solid electrolyte proceeds in a particularly advantageous manner.

Since, during the process, the upper reduction stage of the metal serving as the oxygen electrode is reduced, the oxide must be reoxidized by a stream of oxygen or air which is admitted through the inlet tube 3.

It appears that at least enough oxygen must be continuously admitted for the reversal of oxidation of the coal or of the combustible gases, so that the stoichiometrical ratio for the formation of $CO_2$ is reached.

Extensive experimental data have revealed that the electromotive force which, as is well known, is a measure of the efficiency, will decrease if large excess quantities of oxygen are admitted. This is believed to be caused by the formation of meta-stable higher alkali oxides which cause a deviation from the simple mechanism of conduction assumed so far. This deviation has been verified by numerous experiments. The following table shows the results of one of these experiments:

*Dependence of the electromotive force of a fuel element on the flow rate of oxygen*

| Oxygen rate (cc./minute) | Terminal voltage (Volt) |
|---|---|
| 10 | 0.90 |
| 20 | 0.98 |
| 40 | 0.89 |
| 100 | 0.70 |

This would indicate that the direct conversion of the chemical energy of carbon or of the combustible gases into electrical energy by the electrochemical process by reacting the coal or the gases in the form of a fuel cell may be considerably improved and carried out at a higher efficiency if the oxygen required for the reversible oxidation of the coal or the combustible gases is admitted at such a flow rate that the maximum value of the electromotive force or of the terminal voltage is reached. This maximum value is dependent on the flow rate and the particular load.

In practical operation the oxygen stream admitted is adjusted for a given load, so that an inserted volt meter will show a maximum deflection. According to the above-mentioned relationship between the voltage and the efficiency, the cell will then operate at maximum efficiency.

This relationship between the oxygen rate and the supplied voltage may be utilized so that the cell is always operated at optimum efficiency, even with a varyling load. This is effected by controlling the oxygen flow rate in accord with the maximum voltage. This controlling may be effected by any known automatic controlling device.

The anode is formed by the coal 7 in the interior of the solid conductor 2. When using solid fuels, it is of advantage if these fuels do not cake together. Particularly well suited are coals which contain little bitumen, such as, for example, so-called lean coals or anthracite. Also coke has proven particularly good, whether normal mineral coal coke or the so-called petroleum coke obtained from petroleum residues is used. Corresponding to the dimensions of the element, the fuel particles must not be too large, a diameter of approximately 1–5 mm. being most favorable.

A carbon rod or metallic conductor 5 may be used for leading off the current. In the element operated with gaseous fuels (Fig. 2), the electrode 5 which has the form of a tube serves at the same time as a gas inlet. The gas stream which is controlled by a regulator (which is not contained in the drawing), is measured by a gas meter 9, while the waste gas escapes at 10.

The fuel cell could be arranged in a furnace which is not shown in the drawing, in order to maintain the reaction temperature required within the cell. This reaction temperature is approximately 700–800° C.

When the fuel cell is heated to approximately 650° C., a voltage of about 0.99 to 1.0 volt develops. The theoretical voltage which may be obtained from the electrochemical process and which is independent of the voltage, is approximately 1.02 volts. Thus, the efficiency which is equal to the ratio of the actual terminal voltage reached to the theoretically possible terminal voltage, reaches a value of about 98%. When using current from the cell, the amount of current is determined—aside from the electromotive force of the element—by the external and internal resistance. Consequently, it is necessary to keep the internal resistance of the cell as low as is possible. As contrasted to these formerly used solid conductors, the internal resistances obtainable in accordance with the invention are relatively low. These resistances amount to approximately 1–2 ohms at temperatures of about 700–800° C.

It is also possible to use the cell for effecting the electrochemical conversion of combustible gases such as hydrogen, methane, carbon monoxide, etc. and mixtures thereof, as shown, for example, in Fig. 2, which shows an arrangement corresponding to that of Fig. 1 for the conversion of chemical energy of combustible gases, rather than solid fuels, into electrical energy. When using the fuel cell (Fig. 2) for this purpose, the carbon filling in the solid conductor tube 2 is replaced, for example, by iron or other metal shavings 7, and the fuel gas is admitted through a central inlet tube 5, which also serves as an electrode. The passage of gas into the device is measured by meter 9, and waste gas leaves the device through line 10.

As has already been mentioned, elevated temperatures are required for the operation of the fuel cell. Although no heat is consumed by the electrochemical process itself, a certain amount of heat is, of course, always lost to the surrounding environment by conduction and radiation, even if efforts are made to reduce such losses as far as possible by heat insulation of the outer coating.

The fuel cell, as has been mentioned, has a certain internal resistance. It is known that the contact resistance between two pieces lying one upon the other may be reduced by an external pressure. This is because the effective contact surfaces of the material which are not completely rigid, may be enlarged by an external load. This is the principle on which a carbon microphone operates.

It has now been found that the direct conversion of the chemical energy of the carbon or of the combustible gases, such as hydrogen, methane, carbon monoxide or mixtures thereof into electrical energy be electrochemical process with the use of the fuel cell, may be carried out with a considerable improvement in the amount of energy obtained if the contact resistances of the individual constituents were reduced by a suitable mechanical load, thereby reducing the internal resistanec of the cell.

The particular mechanical load and the current increase which may be obtained thereby is dependent largely upon the material used and on the temperature. Thus this increase will be dependent on the type of coal, etc., used in the cell and the temperature at which the cell is operated. Under favorable conditions, the internal resistance may be reduced to a value as low as 20 to 25% of its former value by applying a load of approximately 1 kg. per sq. cm. to the fuel.

Fig. 3 diagrammatically shows an embodiment of a fuel cell in accordance with the invention, with means for applying such a mechanical load. 1 is the outer shell of non-scaling material with the inlet tube 3 for the oxygen. 2 is the solid conductor forming the electrolyte, which may consist, for example, of alkali carbonate. The solid conductor is filled with coal 7, which acts as the anode. The space between the solid conductor electrolyte 2 and the metal shell 1 is filled with the metal oxide 6 forming the cathode. A metal conductor 5 extends into the coal and the anode lead is taken off from this conductor. A piston 11 loaded by a spring 12, exerts a pressure on the coal 7. The tension of the spring may be regulated by the screw 13 and so adjusted until additional pressure will not further substantially reduce the internal resistance. In order to prevent a short circuit between the anode and cathode, they are separated from each other by a ring 14 of insulating material, such as porcelain.

Due to the internal resistance of the cell, a certain amount of heat will form, according to Joule's law, as a current load is applied to the cell. By an appropriate arrangement of the elements and of the external load of cycle, the heat developed within the cell may be just sufficient to compensate for the heat lost to the surrounding environment.

It is of great advantage, therefore, to adjust the internal resistance of the fuel element so that the heat losses are just compensated in this manner. This may be achieved in a very simple manner, for example, when using the current supplied by the element for the electrolysis of a metal salt solution.

Though the preferable temperature for operation of the cell is approximately between 700 and 800° C., the cell may be practically operated at any temperature between about 600 and 850° C.

I claim:

1. Process for the direct conversion of the chemical energy by an electrochemical process by reacting the combustible material in the form of a fuel chain of combustible material into electrical energy, which comprises maintaining a substantially solid body containing silicate-free electrolyte selected from the group consisting of salts of the alkali and alkaline earth group as the conductor for this fuel chain between such a combustible material and as the oxygen electrode a metal oxide, maintaining the components at a temperature of about 600 to 850° C., thereby establishing an electropotential difference between said combustible and said metal oxide and effecting said conversion into electric energy.

2. Process according to claim 1, in which said solid body is a porous ceramic body which is soaked with a member of said group.

3. Process according to claim 1, in which said ceramic body is MgO and completely free of silicates.

4. Process according to claim 1, in which said solid body is a carrierless body of a carbonate salt of a member of said group.

5. Process according to claim 4, in which said carrierless body is prepared by fusion.

6. Process according to claim 1, in which said solid body is a carrierless body prepared by pressing and sintering a carbonate salt of said group member.

7. Process according to claim 1, which includes passing an oxidizing gas in contact with said metal oxide.

8. Process according to claim 7, in which said oxidizing gas is passed in contact with said metal oxide at a flow rate at which the maximum electropotential difference is maintained between the metallic oxide and the combustible material said value producing the maximum value of the electromotive force.

9. Process according to claim 1, in which said metallic oxide is a mixture of cupric and cuprous oxides.

10. Process according to claim 9, in which said copper oxide is a copper oxide prepared by oxidizing substantially pure copper particles in an oxidizing atmosphere.

11. Process according to claim 1, in which said metallic oxide is a mixture of cupric and cuprous oxides and in which that copper oxide is prepared by at least the partial oxidation of copper, while said solid body is maintained between it and said combustible material.

12. Process according to claim 1, which includes maintaining a mechanical load on said combustible material.

13. Process according to claim 1, which includes electrically connecting said combustible material and said metal oxide through a current load maintained so that the internal resistance between the combustible material and the metal oxide is so adjusted that the internal heat caused by said internal resistance compensates the external heat loss.

14. Process according to claim 1, in which combustible material is a coal material.

15. Process according to claim 1, in which said combustible material is a combustible gas passed in contact with metallic particles.

16. Process according to claim 15, in which said combustible gas is selected from the group consisting of hydrogen, methane, carbon monoxide and mixtures thereof.

References Cited in the file of this patent
UNITED STATES PATENTS

| | | |
|---|---|---|
| 379,180 | Partz | Mar. 6, 1888 |
| 649,653 | Blomenberg | May 15, 1900 |
| 856,162 | Kitsee | June 4, 1907 |
| 919,022 | Jungner | Apr. 20, 1909 |
| 1,225,175 | Reed | May 8, 1917 |
| 1,484,784 | Heise | Feb. 26, 1924 |
| 2,310,354 | Deysher | Feb. 9, 1943 |
| 2,570,543 | Gorin | Oct. 9, 1951 |
| 2,581,650 | Gorin | Jan. 8, 1952 |
| 2,581,651 | Gorin | Jan. 8, 1952 |

UNITED STATES PATENT OFFICE
CERTIFICATE OF CORRECTION

Patent No. 2,830,109      Eduard Justi et al.      April 8, 1958

It is hereby certified that error appears in the printed specification of the above numbered patent requiring correction and that the said Letters Patent should read as corrected below.

Column 1, line 54, for "diffiiculties" read -- difficulties --; line 66, for "theoretical" read -- theoretically --; column 2, line 35, after "has" insert -- now --; column 4, line 42, for "punger" read -- plunger --; column 5, line 49, for "and" read -- und --; column 6, line 63, for "varyling" read -- varying --; column 7, line 68, for "resistanec" read -- resistance --; column 8, lines 41 and 42, strike out "by an eletrochemical process by reacting the combustible material in the form of a fuel chain"; line 43, after "energy" and before the comma insert -- by an electrochemical process by reacting the combustible material in the form of a fuel cell --; line 47, for "chain" read -- cell --.

Signed and sealed this 3rd day of June 1958.

(SEAL)
Attest:
KARL H. AXLINE
Attesting Officer

ROBERT C. WATSON
Commissioner of Patents